Figure 1:
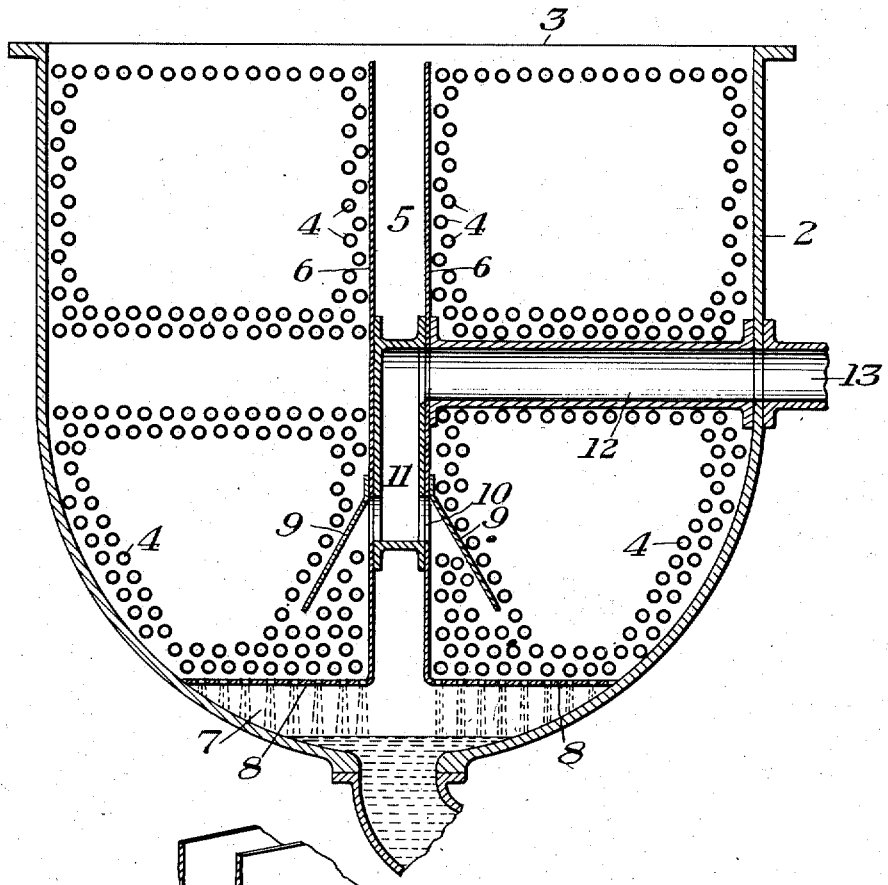

Sept. 17, 1929. R. N. EHRHART Re. 17,433

CONDENSER

Original Filed Jan. 18, 1923

INVENTOR
Raymond N. Ehrhart
By Byrnes, Stiles + Warnke
His Atty's

Reissued Sept. 17, 1929

Re. 17,433

UNITED STATES PATENT OFFICE

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA

CONDENSER

Original No. 1,522,290, dated January 6, 1925, Serial No. 613,367, filed January 18, 1923. Application for reissue filed March 11, 1927. Serial No. 174,670.

The present invention relates broadly to heat exchange, and more particularly to a heat exchanging means in the form of a tubular condenser of the surface type having a conduit leading from the vapor space at the inlet end of the condenser to a chamber below the tube nests for maintaining a high condensate temperature, as claimed, for example, in my copending application Serial No. 587,196, filed September 9, 1922, although the specific construction of the condenser is immaterial.

This invention has to do particularly with the removal of non-condensable gases, such as air, from the condenser. It has heretofore been proposed to effect the removal of the air by means of a separate air connection on each side of the condenser. In many cases, however, it is desirable to use only one air pumping means, and where such single means must withdraw from both of the air connections an elaborate and expensive pipe layout is required to reach both sides of the condenser. As condensers are frequently as large as twenty feet in diameter, the expense and complication involved in such an arrangement become apparent. Furthermore, if the air pumping means is located at a high level with respect to the condenser, operating problems are encountered. It is not feasible to bring the connections underneath the condenser and then to the pumping means, as the piping will form a trap for the collection of water, thereby interfering with efficient air removal. On the other hand, it is often difficult to bring air pipes over the top of the condenser to obviate this trapping action, inasmuch as the foundations of the turbine exhaust seriously interfere with such an arrangement.

Also, it has been proposed to withdraw air through a single conduit extending downwardly through the bottom of the condenser substantially centrally thereof. When the air pumping means has been located at a high level, this construction also forms a water collecting trap interfering with the withdrawal of the air.

By the present invention, there is provided an efficient construction for removing the non-condensable gases without the necessity of employing an expensive piping layout. Also, the objection to water trapping is effectively overcome.

In the accompanying drawings, there is illustrated, more or less diagrammatically one embodiment of the present invention, it being understood that the drawings do not define the limits of the invention, and that changes may be made in the construction and operation disclosed therein without departing from the spirit or scope of my broader claims.

In the drawings:—

Figure 2:
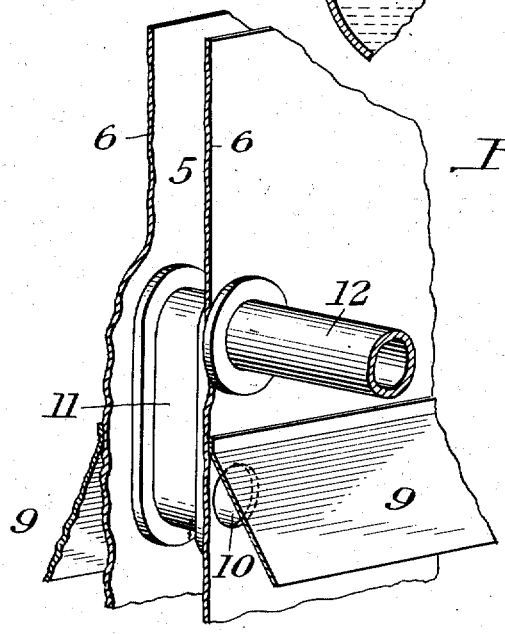

Figure 1 is a vertical sectional view through a condenser constructed in accordance with the present invention; and Figure 2 is a perspective view, partly broken away, illustrating a portion of the withdrawing means for the non-condensable gases.

In carrying out the present invention, there may be provided a condenser shell 2 of any usual or well known construction having a vapor receiving opening 3 at its upper end. Formed within the shell 2 are a plurality of banks or nests of tubes 4 between which the vapor passes during its travel through the condenser.

Extending from the vapor space above the tubes 4 and adapted to conduct vapor from such space to a point adjacent the terminus of flow through the condenser, is a conduit 5 in the illustrated embodiment of the invention, this conduit is formed by spaced plates 6 extending longitudinally of the condenser and located between the tubes. The exact construction and location of the conduit is, however, immaterial.

There is preferably formed adjacent the terminus of flow through the condenser proper, a zone or chamber 7 which is separated from the interior of the condenser proper by a perforated plate 8. The openings in the plate 8 are of such size and number that the condensate from the condenser is permitted to readily pass therethrough, and the non-condensable gases from the chamber are permitted to pass upwardly into the condenser without, however, permitting the passage of sufficient vapor from the conduit 5 to cause the condenser to become bound.

Extending angularly outwardly and downwardly from the respective plates 6, are baffles 9. These baffles are adapted to serve as guiding means for the non-condensable gases within the condenser and for the non-condensable gases liberated from the chamber 7. These non-condensable gases are in turn directed through openings 10 in the plates 6 to the interior of a chamber 11 formed in any desired manner, or by a suitable casting, and secured in position between the plates 6. It will be apparent that any desired number of chambers 11 may be provided and spaced at suitable intervals throughout the length of the conduit 5. From these chambers the non-condensable gases pass through suitable openings into conduits 12 extending laterally through the banks of tubes to one side of the condenser. From this point on the side of the condenser the gases may be effectively withdrawn through a suitable ejecting connection 13 leading to an ejector, pump or other withdrawing means. Irrespective of whether this withdrawing means is located at a higher or lower point than the condenser there is not provided any piping in which trapping of water may occur.

The advantages of the invention arise from the provision of a condenser in which it is possible to withdraw the non-condensable gases without the provision of an expensive piping layout and without the difficulties caused by the trapping of water.

I claim:

1. In a condenser, a shell having a tube nest therein, a conduit for conducting fluid to a zone below said tube nest, and means at least partly supported by said conduit for conducting non-condensable gases to a point on the side of the condenser shell.

2. In a condenser, a shell having a tube nest therein, a conduit for conducting fluid to a point adjacent the flow terminus through the tube nest, and means at least partly supported by said conduit for conducting non-condensable gases to a point on one side of the condenser shell.

3. In a condenser, a shell having a tube nest therein, a conduit for conducting fluid to a point adjacent the flow terminus of the tube nest, and means extending from said conduit to said shell for conducting non-condensable gases to a point on one side of the condenser shell.

4. In a condenser, a shell having a tube nest therein, a conduit for conducting vapor to a point adjacent the flow terminus of the tube nest, and means extending to a point on one side of the condenser shell for withdrawing all of the non-condensable gases.

5. In a condenser, a shell having a tube nest therein, a conduit for conducting vapor to a point adjacent the flow terminus of the tube nest, and means within the shell and extending to a point on one side of the shell for withdrawing non-condensable gases from the condenser.

6. In a condenser, a shell having a plurality of banks of tubes therein, a conduit for conducting vapor to a point adjacent the terminus of flow through said banks of tubes, and means extending between certain of said banks of tubes for conducting non-condensable gases from within the condenser to a point on one side thereof.

7. In a condenser, a shell having a tube nest therein, a conduit for conducting vapors to a point adjacent the terminus of flow through said tube nest, means within said conduit for receiving non-condensable gases from the condenser, and means for conducting said gases from said means to a point on one side of the condenser.

8. In a surface condenser, a shell having a plurality of tube nests therein, a heating chamber within the shell below the tube nests, means extending between the tube nests for passing steam independently thereof into the heating chamber, means for permitting the escape of gases from the heating chamber to the tube nests, and means for conducting such gases to a point on one side of the condenser shell.

In testimony whereof I have hereunto set my hand.

RAYMOND N. EHRHART.